United States Patent [19]

Agnoff

[11] Patent Number: 4,715,765

[45] Date of Patent: Dec. 29, 1987

[54] GRAVITY FLOW STORAGE SYSTEM

[76] Inventor: Charles Agnoff, 8 Split Rock Ct., Melville, N.Y. 11747

[21] Appl. No.: 850,227

[22] Filed: Apr. 10, 1986

[51] Int. Cl.[4] .................................................. A47F 5/00
[52] U.S. Cl. .................................... 414/276; 211/151; 414/286
[58] Field of Search ............... 414/267, 276, 286, 233, 414/234, 239; 211/151

[56] References Cited

U.S. PATENT DOCUMENTS

| | | | |
|---|---|---|---|
| 3,837,511 | 9/1974 | Howlett | 414/286 X |
| 4,197,047 | 4/1980 | Haldimann | 414/276 |
| 4,304,521 | 12/1981 | Hammond | 414/276 X |
| 4,341,313 | 7/1982 | Döring | 414/276 X |
| 4,462,500 | 7/1984 | Konstant et al. | 414/276 X |
| 4,527,937 | 7/1985 | Tomasello, Jr. | 414/276 X |
| 4,613,270 | 9/1986 | Konstant et al. | 414/276 |

*Primary Examiner*—Robert J. Spar
*Assistant Examiner*—David A. Bucci
*Attorney, Agent, or Firm*—Collard, Roe & Galgano

[57] ABSTRACT

A gravity flow storage system for storing pallets includes at least one pair of parallel and laterally spaced-apart conveyors having a plurality of rotatably mounted, parallel longitudinally spaced-apart rollers. The conveyors are disposed at an inclined angle to define a storage lane having a front lower end and a rear upper end. At least one pair of pallet carrier sets are provided, each of which is disposed respectively on an associated conveyor and includes at least two nested telescoping pallet carriers having an innermost and an outermost pallet carrier. The nested pallet carriers normally rest upon the conveyor rollers and are longitudinally displaceable on the associated conveyor via the rollers thereof. Corresponding pallet carriers of the carrier sets cooperate to support a pallet thereon. The system is loadable by successively placing pallets onto corresponding carriers at the front lower end and then moving the pallets on the corresponding carriers rolling on the rollers towards the rear upper end, beginning with the outermost carriers. The system is conversely unloadable by successively removing pallets at the front lower end, thereby allowing any previously loaded pallets to move under the force of gravity towards the front lower end.

8 Claims, 3 Drawing Figures

GRAVITY FLOW STORAGE SYSTEM

BACKGROUND OF THE INVENTION

The invention relates to a gravity flow storage system for storing loaded pallets. More particularly, it relates to a "LIFO" (last-in/first-out) storage system intended for use in confined areas wherein lift truck access is only available at one end of the system.

In conventional drive-in or aisle-type fixed rack storage systems, lift trucks are required for every product or pallet movement. In contrast, a gravity flow or live storage system makes use of conveyors fitted with wheels or rollers, and suitable speed control devices, which are selected according to the type of pallet used in the system. The conveyors are inclined at a slight angle with respect to the floor. After a pallet is initially loaded into the system, it moves at a controlled speed under the force of gravity towards the lower end or discharge face of the rack system where it can be removed by fork lift, stacker, or other material handling equipment. This type of gravity flow storage system is frequently referred to as a "first in/first out" ("FIFO") storage system.

These gravity flow systems can provide high storage density due to the elimination of access aisles previously needed to allow lift trucks to maneuver while loading and unloading pallets. In addition, the storage system operating requirements for fork lift truck operations, loading times, and operating personnel can be substantially reduced. Moreover, with such gravity flow storage systems, high storage density is also achieved because no empty space is left between the stored pallets, which abut each other under the force of gravity. In such storage systems, it is only necessary to access the loading face where the pallets are placed into the storage system, and the discharge face from where the pallets are removed. In between the loading and discharge faces, pallets move "downstream" automatically by gravity, without the assistance of any other operator-controlled material handling equipment.

Such "FIFO" gravity flow storage systems have been quite successful for relatively large storage facilities. However, they typically are not suitable in small storage facilities where because of dimensional and configurational restrictions it is not possible to provide adequate access space for the loading and discharge ends of the rack system. For example, the storage area may be long and narrow with access available at only one narrow end. Moreover, even if sufficient access were available at both narrow ends of such a storage space, it might be more advantageous for applications where a variety of different products are being stored to have access to a large number of pallet storage lanes having a relatively short multi-pallet depth (e.g., 3-5 pallets) rather than just two or three long lanes.

To accommodate such smaller storage facilities, a variety of "LIFO" (Last-in/First-out) gravity flow storage systems have been proposed wherein, the rollers or conveyors are inclined from the rear end of the rack, which is normally situated against a wall. The front end of the conveyor provides access for both loading and unloading pallets onto the rack. However, these storage systems have been relatively complex and often themselves occupy a substantial amount of space, thereby significantly reducing the available storage space in any particular application.

Specifically, one known system utilizes ovelying or stacked carts having wheels which roll upon inclined rails However, the overlying nature of the carts causes them to occupy additional height and width within the storage system, thereby wasting storage space. In addition, because they must carry the entire pallet weight directly, the overlying carts must be constructed from relatively large and heavy structural members, and include a centrally located support or cross beam. This not only takes up additional storage space, but it also requires the system structure be sufficient to carry not only the payload weight of the pallets, but also the substantial weight of the carts themselves. Moreover, the crossbeams of the carts tend to interfere with the insertion of lifting forks during fork-lift operations. In addition, each cart requires its own set of wheels.

Another important consideration in rack storage is that the bottom surface of a conventional wooden pallet is generally poorly suited for acting as a roller facing or bearing surface. While it is possible that such pallets can be moved directly on wheel or roller conveyor in a flow storage system, their operation therein is erratic and pallets frequently "hang-up" in the upstream position. In such cases, operating personnel may be required to climb into the supporting structure to free "stuck" pallets, thereby subjecting themselves to possible injury. Similarly, broken or defective wooden pallets cannot be conveyed safely and reliably in conventional flow storage racks. Moreover, existing storage systems cannot easily handle "slave" pallets which are generally made of plywood or steel, and are usually from $\frac{3}{4}''$ to $1\frac{1}{2}''$ thick but without provision for lift truck forks to enter into the pallet itself. Hence, the forks support the pallet on its bottom surface, and in such cases, existing systems using carts are not practical, because setting the pallet down on the cart is impossible, due to the position of the forks in between the cart and pallet.

Accordingly, it is an object of the present invention to provide a flow storage system that may be operated with access to only one of its ends.

It is also an object of the invention to provide such a flow storage system having an automatic last in/first out ("LIFO") rotation of inventory.

Yet another object of the present invention is to provide such a flow storage system capable of readily operating with slave pallets and with conventional wooden pallets, even if they are broken or defective.

It is yet another object of the present invention to provide such a flow storage system which itself is compact and thereby allows for a maximum amount of storage space therein.

It is yet another object of the invention to provide such a flow storage system which may be easily loaded and unloaded by a fork-lift truck.

It is still another object of the invention to provide such a flow storage system which is of simple and economical construction, easy to use and install, and which is safe and reliable in operation.

SUMMARY OF THE INVENTION

Certain of the foregoing and related objects are readily attained in a gravity flow storage system for storing pallets comprising at least one pair of parallel and laterally spaced-apart conveyors having a plurality of parallel longitudinally spaced-apart rollers rotatably mounted in a frame. The conveyors are disposed at an inclined angle to define a storage lane having a front lower end and a rear upper end. At least one pair of pallet carrier sets are provided with each of the sets disposed respectively on an associated conveyor. The sets have at least two nested telescoping pallet carriers including an innermost and an outermost pallet carrier. The nested pallet carriers are normally resting upon the conveyor rollers and are longitudinally displaceable on their associated conveyor via the rollers thereof. Corresponding pallet carriers of the carrier sets cooperate to support a pallet thereon such that the system is loadable by successively placing pallets onto corresponding carriers at the front lower end and moving the pallets (e.g. by pushing the pallets with the next pallet to be loaded carried by a fork lift truck), on the corresponding carriers rolling on the rollers towards the rear upper end, beginning with the outermost, carriers. The last pallet loaded into the storage system is placed directly on the conveyor frame or housing. The system is conversely unloadable by successively removing pallets at the front lower end, thereby allowing the previously loaded pallets to move under the force of gravity towards the front lower end.

Preferably, the conveyors each include a pair of opposing generally C-shaped channel sections forming the conveyor frame and supporting the rollers therebetween. The carriers may be elongated, generally inverted U-shaped sections, disposed substantially in between the channel sections with the legs of the U-shaped sections resting on the rollers. Most desirably, the pallet carriers of each set which occupy the same relative positions within the sets have approximately the same lengths, and the pallet carriers within each set have lengths approximately equal to integer multiples of the length of the pallets.

In a preferred embodiment of the invention, lock means for preventing unintentional movement of the carriers toward the rear end are provided and includes a pair of spring-actuated levers, each of which is pivotally mounted on one of the conveyors for movement between an upper and lower position. The levers in the upper position are disposed to engage a carrier end such that the carrier end is lifted substantially off of the rollers of its associated conveyor. The levers in the lower position are then disengageable therefrom to allow intended passage of a carrier thereover. The storage system may additionally include a frame supporting the pair of conveyors. A multiplicity of vertically spaced-apart pairs of conveyors, supported by the frame to form a vertical column of storage lanes, may also be provided. Preferably the conveyors are at an inclination of about one-half inch per foot.

Other objects and features of the present invention will become apparent from the following detailed description when taken in connection with the accompanying drawings which disclose a single embodiment of the invention. It is to be understood that the drawings are designed for the purpose of illustration only, and are not intended as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
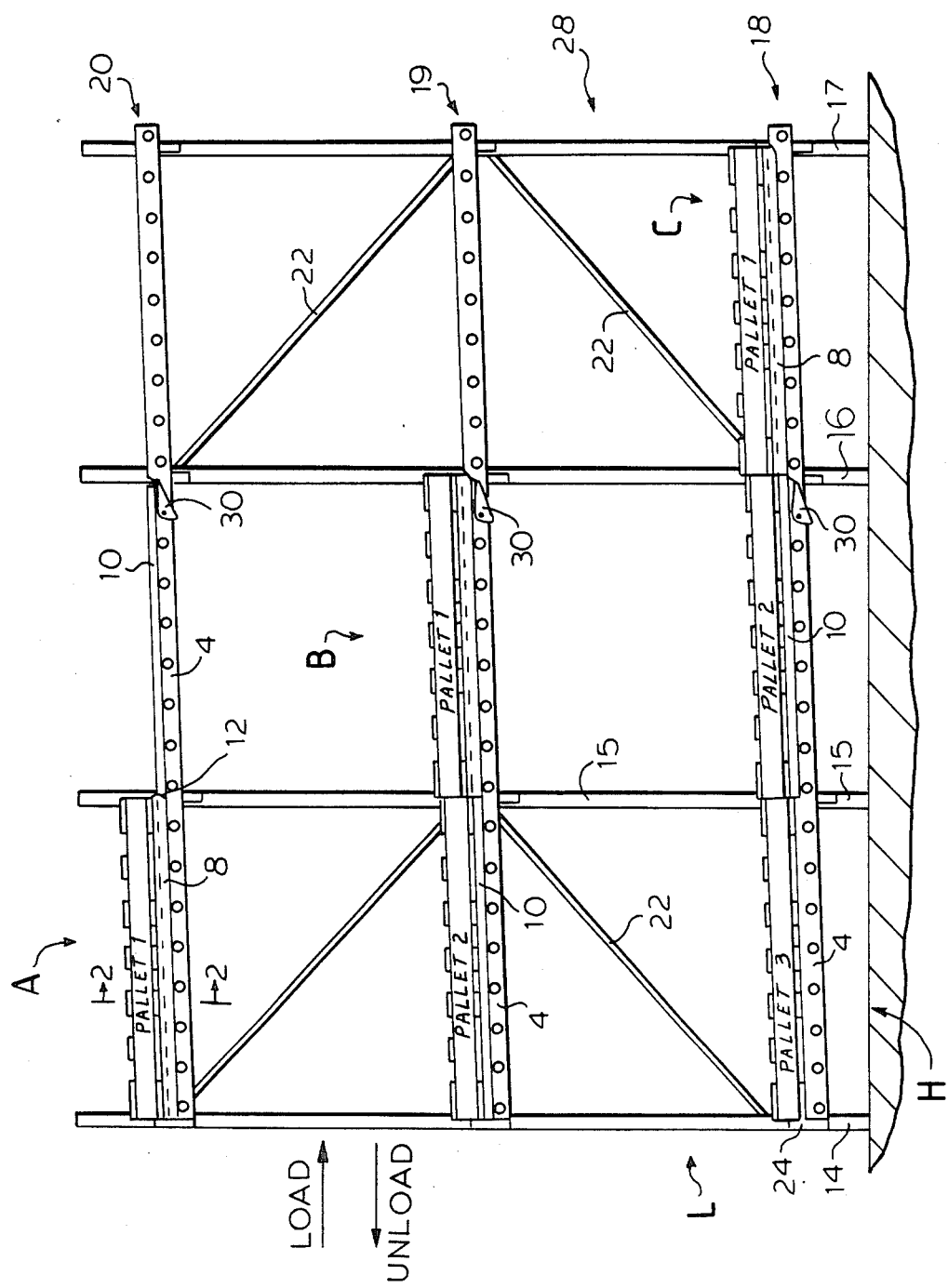
FIG. 1 is a schematical side elevational view of the storage system embodying the present invention.
Figure 2:
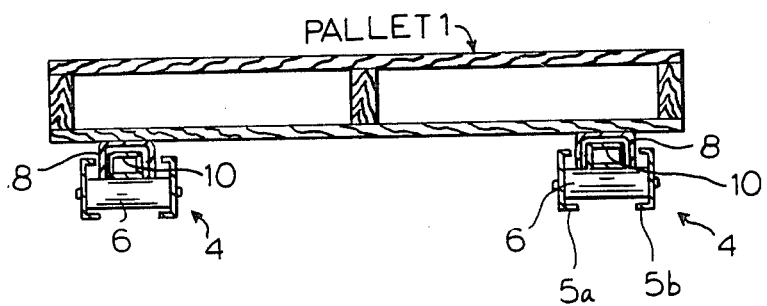
FIG. 2 is a fragmentarily-illustrated sectional view taken along line 2—2 of FIG. 1.

Turning now in detail to the appended drawings, therein illustrated is a novel gravity flow storage system embodying the present invention which, as shown best in FIGS. 1 and 2, basically includes a multiplicity of paired spaced-apart, parallel conveyors 4 mounted upon upstanding supports 14–17 at an inclined angle with respect to the floor or horizontal H. In the preferred embodiment, there is an upward inclination of about ½ inch per foot from the loading side L to the rear of the gravity storage system. Conveyors 4 are comprised of a frame composed of two opposing, generally C-shaped channel sections 5a, 5b holding a multiplicity of rotatably mounted and longitudinally spaced-apart parallel rollers 6. Each conveyor 4 has a set of U-shaped pallet carriers arranged in a nested, telescoping manner normally resting atop rollers 6 between channel sections 5a, 5b. The embodiment of the invention illustrated in FIG. 1 has three pallet-storage positions A, B and C and correspondingly includes only a first carrier 8 and a second carrier 10 dimensioned so that it may be positioned completely within the envelope of first carrier 8 in a telescoping-like manner. However, additional pallet storage positions, and in turn pallet conveyors, may be added according to the particular application.

First carrier 8 is approximately equal to the length of the pallets to be loaded and stored in the system. Second carrier 10 is about twice as long as first carrier 8, and therefore extends on conveyor 4 through two storage positions. Both carriers 8 and 10 may be rolled or displaced longitudinally on conveyors 4 with a minimum amount of exerted force.

Figure 3:
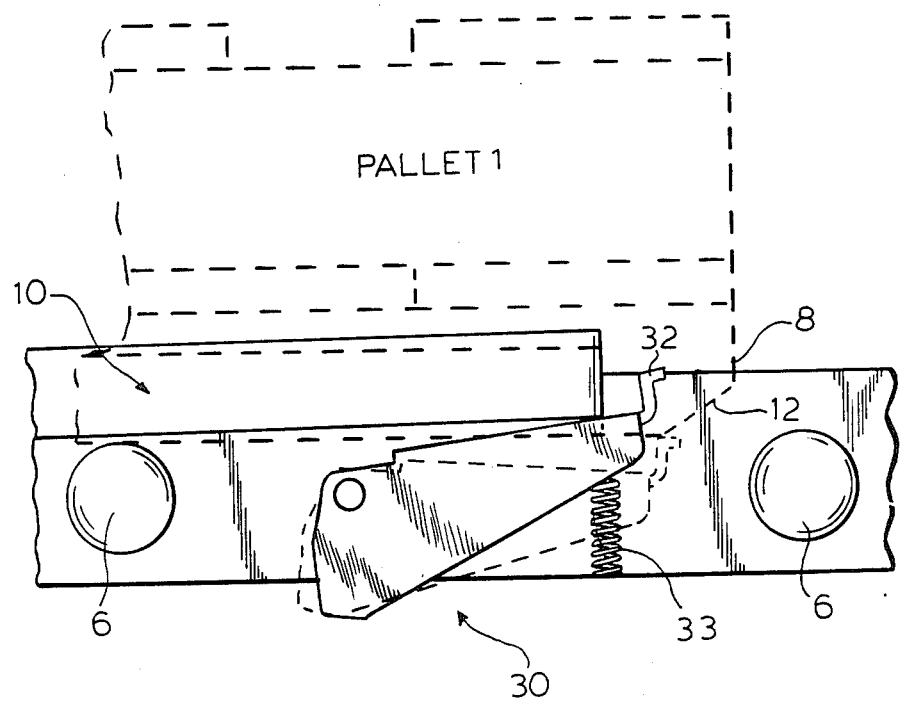
FIG. 3 is a fragmentarily-illustrated side elevational view on an enlarged scale of the rear lock mechanism illustrated in FIG. 1, with the "up" position of the lock mechanism as it engages and lifts the innermost carrier shown in solid line, and the "down" position of lock mechanism as it is disengaged by an overlying carrier, in phantom line.

When no pallets are being stored within the system, carriers 8 and 10 are positioned on conveyors 4 towards the lower or access and loading side L of the system. In operation, the first pallet to be loaded (pallet 1) is delivered through the access end L into storage position A by a fork lift truck or other material handling equipment. Pallet 1 is then lowered onto first carriers 8 and, e.g., the fork lift truck is withdrawn. To load pallet 2, a fork lift truck delivers pallet 2 to access side L and then pushes pallet 2 against pallet 1 so that pallet 1 and the first set of carriers B on which pallet 1 is resting is displaced away from end L and slightly upwardly on conveyors 4 until pallet 1 and carriers 8 are entirely within storage position B. As pallet 1 is pushed on conveyors 4 by the fork lift pushing pallet 2, carriers 8 roll on rollers 6 of conveyors 4 thereby causing the rollers 6 over which carrier 8 is passing to rotate. As second carriers 10 are also resting on the rollers of conveyors 4, there is a tendency for this movement of first carriers 8 to cause second carriers 10 to also be displaced from their original position, by virtue of the friction between the rotating rollers and the bottom surface of second carriers 10. In order to prevent this from happening and to maintain carrier 10 in its original position before it has received a pallet, each conveyor of the pairs of conveyors is advantageously provided with a rear lock mechanism 30 having a spring-loaded arm 32 which is normally in the "up" position and engages the end of carrier 10, to prevent any unintended displacement thereof. Arm 32 of mechanism 30 is pivotally mounted on its associated conveyor, and is urged upwardly by spring 33. When in the "up" position and engaged, arm 32 lifts the adjacent end of carrier 10 off of rollers 6, as shown in solid line in FIG. 3, so that carrier 10 is supported only by arm 32, and the first roller of the conveyor. Rollers 6 may then freely rotate as carrier 8 is rolled thereon, while carrier 10 remains stationary. As carrier 8 passes over lock mechanism 30, detant 12 forces arm 32 to pivot into the "down" position, thereby disengaging it from carrier 10, as shown in phantom in FIG. 3, so that carrier 10 may thereafter be moved.

As pallet 2 pushes pallet 1 slightly uphill into position B, pallet 2 is simultaneously entering storage position A. As load positions A, B and C have the same dimensions and are equal in length to the pallets (the pallets all being of equal length), pallet 1 becomes entirely displaced into storage position B just as pallet 2 becomes positioned into storage position A. The fork lift truck may then lower pallet 2 onto carriers 10 which are extending through load positions A and B, with the sections of carrier 10 extending into storage position A having been uncovered by carriers 8 which are now supporting pallet 2 in storage position B.

The last pallet to be loaded in this embodiment, pallet 3, is delivered to the access side L and as was done previously with pallet 2, using the fork lift truck, pallet 3 is pushed against pallet 2, thereby simultaneously moving pallet 1 into storage position C, pallet 2 into storage position B, and pallet 3 into storage position A. Rear lock mechanism 30 having been previously released by the passage of carriers 8 thereover, allows carriers 10 to be displaced into load positions B and C during this final loading step. At this point, carriers 8 are within storage position C and carriers 10 are occupying load positions B and C, so that there are no carriers remaining in storage position A. Thus, when pallet 3 is deposited into storage position A by the fork lift truck, it rests directly on sections 5a and 5b of conveyors 4. As conveyor rollers 6 are partially enclosed by these sections, pallet 3 does not come into contact with rollers 6 which remain free to rotate. Sections 5a and 5b therefore support pallet 3 in the manner of an ordinary shelf, with pallet 3 not being rollable or slidable thereon.

In order to remove or unload pallets from the storage system, the loading sequence of steps is followed in reverse order. Pallet 3 is engaged by e.g., a fork lift truck, is lifted off of conveyor sections 5a and 5b and is backed out or removed from storage position A through access side L. As pallet 3 is withdrawn, pallets 2 and 1 solely under the force of gravity roll on their carriers 10 and 8, respectively, downhill on conveyors 4 towards access side L, so that when pallet 3 is entirely withdrawn from the storage system, pallet 2 again occupies storage position A and pallet 1 rolls into storage position B. As this occurs, carriers 8 slide off of rear lock mechanism 30 which then pivots back into its locked "up" position under the influence of spring 33, as arm 32 is no longer depressed or held down into the unlocked "down" position by carrier 10. Preferably, pallet 3 is withdrawn from storage position A in a smooth and gradual motion by the fork lift truck so that pallets 2 and 1 move towards access side L, at a rate of speed controlled by the receding fork lift truck. In this way, pallets 2 and 1 avoid an abrupt and jarring impact as pallet 2 and/or carrier 10 roll into stop 24 adjacent to access side L, which would otherwise occur if pallet 3 were quickly removed from the storage system. As the rolling interaction occurs between rollers 6 and carriers 6 and 10, the pallets themselves, even though they may have uneven or broken bottom surfaces, may nevertheless be conveyed smoothly and reliably.

With pallet 3 removed, pallet 2 once again occupies storage position A, with carrier 10 now in load positions A and B, and pallet 1 and carriers 8 disposed in storage position B. pallet 2 can then be removed from storage system 1 by a fork lift truck through access side L, as was done previously during the removal of pallet 3. Finally, pallet 1 may also be removed from storage position A through access side L, as were the other pallets.

As shown in FIG. 1, several layers of conveyors 4 may be provided in a stacked configuration on supports 14–17 creating levels 18–20 of storage lanes. Storage levels 19 and 20 have a construction and operation identical to that of level 18 previously described. The vertical spacings between levels 18–20 are determined generally according to the height of the loads carried by the pallets. Diagonal support bars 22 may be provided between supports 14–17 to provide a stronger structure. As pallets are loaded and unloaded only through access side L, diagonal supports 22 disposed at the sides of the load positions do not at all interfere with the operation of the storage system. No access is required to rear surface 28 or to the sides of the storage system, thereby allowing it to be installed in a corner, against a wall, etc. In addition, due to the fact that the paired conveyors are laterally spaced apart without any lateral interconnection, the forks of a fork lift truck may be quickly and easily engaged underneath wooden or slave pallets, without the need for precise alignment. As best illustrated in FIG. 2, conveyors 4 and carriers 8 and 10 have an exceptionally low profile thereby providing for a more effective use of space within the available volume of the storage system. Carriers 8 and 10, which are supported on the common rollers 6 of conveyors 4, also eliminate the need for separate support rollers for each carrier.

Of course, the storage system may be multiplied or repeated in the lateral direction to provide additional storage space. Moreover, the storage system could also be expanded vertically by extending supports 14–17 and by providing additional storage levels beyond the three levels 18–20 shown in FIG. 1. In addition, although the embodiment illustrated includes three storage positions, i.e., A, B and C, additional storage positions could be created by increasing the depth of the system, and by providing additional carriers and lock mechanisms. However, this storage system is ideally suited for a total of 3–7 storage positions. It should also be apparent that other variations might also be possible, and would be apparent to those skilled in the art. For example, it may be possible to have interlocking carriers all of about the same length, and linked to each other in a telescope-like structure. It may also be possible to provide in place of the lock mechanism, a plurality of rows of split rollers, with each row aligned with a leg of a downwardly facing U-shaped carrier.

Thus, while only several embodiments of the invention have been described, it will be obvious that many changes and modifications may be made thereunto, without departing from the spirit and scope of the invention.

What is claimed is:

1. A gravity flow storage system for storing pallets comprising:

at least two parallel and laterally spaced-apart conveyors having a plurality of rotatably mounted, parallel longitudinally spaced-apart rollers, said conveyors being disposed at an inclined angle to define a storage lane having a front lower end and a rear upper end; and at least two independent pallet carrier sets, each of said sets disposed respectively on an associated conveyor, said sets comprising at least two nested telescoping pallet carriers including an innermost and an outermost pallet carrier, with said nested pallet carriers normally resting upon said conveyor rollers and being longitudinally displaceable on said associated conveyor via said rollers thereof, wherein corresponding pallet carriers of said carrier sets cooperate to support a pallet thereon such that said system is loadable by successively placing pallets onto corresponding carriers at said front lower end and moving the pallets on said corresponding carriers rolling on said rollers towards said rear upper end, beginning with said outermost carriers, and said system being conversely unloadable by successively removing palllets at said front lower end, thereby allowing any previously loaded pallets to move under the force of gravity towards said front lower end.

2. The storage system according to claim 1, wherein said conveyors each include a pair of opposing generally C-shaped channel sections supporting said rollers therebetween.

3. The storage system according to claim 2, wherein said carriers are elongated, generally inverted U-shaped sections, and are disposed substantially inbetween said channel sections with the legs of said U-shaped sections resting on said rollers.

4. The storage system according to claim 1, wherein said pallet carriers of each set occupying the same relative positions within said sets have approximately the same lengths, and said pallet carriers within each set have lengths approximately equal to multiples of the length of the pallets.

5. The storage system according to claim 1, further comprising lock means for preventing unintentional movement of said carriers toward said rear end which includes a pair of spring-actuated levers, each of which is pivotally mounted on one of said conveyors for movement between an upper and lower position, said levers in said upper position being disposed to engage a carrier end such that said carrier end is lifted substantially off of said rollers of its associated conveyor, and said levers in said lower position being disengageable therefrom to allow intended passage of a carrier thereover.

6. The storage system according to claim 1, additionally including a frame supporting said pair of conveyors.

7. The storage system according to claim 6, wherein a multiplicity of vertically spaced-apart pairs of said conveyors are provided and supported by said frame to form a vertical column of storage lanes.

8. The storage system according to claim 1, wherein said conveyors are at an inclination of about one-half inch per foot.

* * * * *